United States Patent [19]

Kirk

[11] Patent Number: 4,605,997
[45] Date of Patent: Aug. 12, 1986

[54] SWITCH MODE CONVERTER AND IMPROVED DEADBAND CONTROL THEREFOR

[75] Inventor: Glenn D. Kirk, El Toro, Calif.

[73] Assignee: Mai Basic Four, Inc., New York, N.Y.

[21] Appl. No.: 693,476

[22] Filed: Jan. 22, 1985

[51] Int. Cl.$^4$ ............................................ H02M 3/335
[52] U.S. Cl. ......................................... 363/16; 363/97
[58] Field of Search .................................. 363/16–17, 363/24–26, 55–56, 97–98, 131–134

[56] References Cited

U.S. PATENT DOCUMENTS

| | | | |
|---|---|---|---|
| 3,435,324 | 3/1969 | Bishop | 363/132 |
| 4,034,282 | 7/1977 | Renard . | |
| 4,061,930 | 12/1977 | Nerem . | |
| 4,095,128 | 6/1978 | Tanigaki | 363/56 X |
| 4,150,424 | 4/1979 | Nuechterlein | 363/26 |
| 4,212,029 | 1/1982 | Zellmer . | |
| 4,218,647 | 10/1978 | Hass | 361/18 X |
| 4,302,807 | 11/1981 | Mentler . | |
| 4,325,111 | 4/1982 | Quioque . | |
| 4,456,949 | 6/1984 | Incledon | 363/26 |

OTHER PUBLICATIONS

Boertzel et al., "Overlap Prevention for Switching Regulators", IBM Technical Disclosure Bulletin, vol. 24, No. 7B, Dec. 1981.

*Primary Examiner*—Peter S. Wong
*Attorney, Agent, or Firm*—Amster, Rothstein & Ebenstein

[57] ABSTRACT

A method and circuitry are disclosed for ensuring that cross-conduction of a pair of primary switches coupled across a DC input voltage in a switch mode converter does not occur based on the actual state of the primary switches. The DC input is coupled to the output of the primary switches through a respective primary switch during first and second time periods in respective half cycles of the converter. Each first and second time period is separated by a deadband during which signals are provided to turn each primary switch off. The state of the primary switches is monitored during the deadband, and the deadband is maintained before progressing into the next first or second time period until both primary switches of the pair are off. Converters utilizing the method and circuitry for accomplishing the foregoing are also disclosed.

27 Claims, 5 Drawing Figures

SWITCH MODE CONVERTER AND IMPROVED DEADBAND CONTROL THEREFOR

BACKGROUND OF THE INVENTION

The present invention relates to a switch mode converter and to a deadband control therefor. The present invention also relates to a method of operating a converter.

The term "switch mode converter" is used herein in a broad sense, and encompasses DC to DC, AC to DC, AC to AC and DC to DC switch mode converters. The term "switch" is also used herein in a broad sense and can encompass two or more individual switch elements.

DC to DC switch mode converters convert a DC input voltage to a regulated DC output voltage by chopping the DC input voltage with a primary switch means to convert it to an AC voltage and then rectify and filter the AC voltage to provide the DC output voltage. A transformer or some other means may be provided to change the level of the chopped AC voltage so that the DC output voltage is obtained at the desired level after rectification and filtering. The DC output voltage is regulated by applying control signals to the primary switch means to vary its duty cycle and hence the duty cycle of the AC voltage obtained from chopping.

For a primary switch means including two or more primary switches coupled to the DC input voltage, the primary switches are selectively turned on and off so that the DC input voltage is conducted to an output of the primary switch means through the primary switches. For example, the primary switches can be coupled to the DC input voltage in a half bridge configuration (one pair of primary switches, the two switches of which are coupled in series across the DC input voltage), a full bridge configuration (two pairs of primary switches, the two switches of each pair being coupled in series across the DC input voltage) or a push/pull configuration (one pair of primary switches, the two switches of which are coupled in parallel with the DC input voltage through transformer windings). Each primary switch of a pair is alternately turned on and off by turn-on and turn-off control signals applied to the control inputs of the primary switch means so that each primary switch of a pair alternately conducts the input voltage to the primary switch means output. The converter duty cycle, i.e., the total on-time versus the overall switching period of the primary switches, is varied by the control signals to provide a constant DC output voltage as the DC input voltage and load conditions vary. However, it is imperative that both primary switches of a pair not be on simultaneously to avoid placing virtually a short circuit across the DC input voltage, a condition commonly referred to as "cross-conduction".

In order to prevent cross-conduction, typically, the converter cycle of operation includes a time period in which a signal is provided to the primary switch means control inputs to turn both primary switches of a pair off. This signal is provided between consecutive signals turning one and then the other of the primary switches of a pair on, and this time period is commonly referred to as a "deadband".

During normal operating conditions, the primary switches are controlled so as to preclude simultaneous closure of both primary switches of a pair. However, it is possible during certain operating conditions, such as when the input voltage to the converter is low and during certain dynamic load transients, for both primary switches of a pair to be closed simultaneously. In many converters, transistors are used as the primary switches. Since a transistor has storage time characteristics which delay turn off of the transistor, it is possible for a transistor to be on for a delay period even though a turn-off signal has been applied to the transistor. Cross-conduction can occur after a turn-off signal has been applied to one primary switch transistor of a pair and the next turn-on signal has been applied to the other primary switch transistor before the one primary switch transistor has actually turned off.

In certain instances, it is also possible for a primary switch to remain on for a period of time after a turn-off signal has been generated which is ineffective to turn the primary switch off due to other factors, such as transients generated in the drive circuitry for the primary switches which buck the turn-off signals.

Many switch mode converters utilize a fixed deadband which is calculated to provide sufficient time for the last primary switch of a pair that was on to turn off before a control signal is generated to turn the other primary switch of a pair on. In order to achieve safe operation over a variety of input and load conditions, the deadband period is made relatively long. While this ensures that cross-conduction does not ordinarily occur, it limits the maximum duty cycle obtainable from the converter and, hence, limits the overall conditions over which the converter can regulate. Ensuring against occurrence of cross-conduction by providing a fixed deadband, and seeking to obtain maximum duty cycle are competing considerations. It is desirable to make the deadband as short as possible and yet prevent cross-conduction.

U.S. Pat. No. 4,325,111 (Quioque) issued on Apr. 13, 1982, discloses an example of a switch mode converter in which a fixed deadband is provided.

U.S. Pat. No. 4,302,807 (Mentler) issued Nov. 24, 1981, discloses a switch mode converter having a primary switch turn-off circuit coupled to the converter output transformer which is polarity insensitive. This circuit insures that a turn-off signal is provided to the respective primary switch even if there is a momentary polarity reversal in the transformer secondary which would otherwise prevent the turn-off of one primary switch while the other primary switch is being turned on. However, there is no correlation between the turn-off signal and the actual state of the primary switches so that it is possible for a primary switch to remain on even after a turn-off signal has been supplied to that primary switch.

U.S. Pat. No. 4,061,930 (Nerem) issued Dec. 6, 1977, discloses a switch mode converter having a fixed deadband period obtained by counting a predetermined number of clock pulses when the base drive signal changes polarity state. In addition, a base drive signal is not provided to a primary switch transistor unless that primary switch transistor is forward biased as determined by a comparator coupled to the output of the transistor.

There is thus a need for a switch mode converter in which cross-conduction of the primary switches is prevented under all operating conditions of the converter without essentially sacrificing maximum duty cycle. The present invention provides such a converter.

OBJECTS AND SUMMARY OF THE INVENTION

It is an object of the present invention to prevent cross-conduction in a switch mode converter of its primary switches under essentially all operating conditions of the converter.

It is another object of the present invention to prevent cross-conduction in a switch mode converter of its primary switches under essentially all operating conditions of the converter essentially without shortening the maximum converter duty cycle available.

It is another object of the present invention to switch on one primary switch of a pair of primary switches coupled to an input voltage in a switch mode converter only when both primary switches of the pair are in fact off.

It is another object of the present invention to provide a switch mode converter in which any of the foregoing objects are realized.

The invention disclosed herein achieves the above and other objects, and, briefly, provides a converter which monitors the actual state of a primary switch means having a plurality of primary switches which are selectively turned on in response to control signals applied to the primary switch means, and permits a primary switch of a pair of primary switches coupled to an input voltage to be turned on only when both primary switches of the pair are off.

The primary switch means comprises at least first and second primary switches, at least first and second voltage inputs, control input means and an output, and couples the first and second voltage inputs to the output selectively through one of the primary switches in response to control signals applied to the control input means. The converter generates turn-on control signals to turn one primary switch on during a first time period (e.g., approximately one half of the switching cycle for a two switch primary switch means) and turn-on control signals to turn the other primary switch on during a second time period (e.g., approximately the other half cycle of a two switch primary switch means) and does not generate turn-on signals during third time periods (e.g., deadbands) which separate consecutive first and second time periods. The third time periods are variable in response to monitoring of the state of the primary switches and are extended, i.e., maintained, whenever a primary switch is on during a third time period. In other words, the converter is inhibited from proceeding out of a third time period to the next first or second time period if a primary switch is on during the third time period.

Ordinarily, the first, second and third time periods are of constant predetermined durations. However, if during a third time period a primary switch is on, the third time period will be extended beyond its predetermined time until both primary switches of a pair coupled to the input voltage are off. Also, the first and second time periods are preferably of constant predetermined durations regardless of the duration of the third time period, and only the third time period is alterable should a primary switch be on during the third time period.

According to one embodiment of the invention, a switch mode converter includes the primary switch means described above, controller means, means for generating a signal indicative of the state of the primary switch means, and deadband control means; and generates an output voltage from an input voltage applied to the voltage inputs of the primary switch means.

The controller means is coupled to the primary switch means control input means and provides at least one turn-on control signal during the first time period to turn a first primary switch on and at least one turn-on control signal during the second time period to turn a second primary switch on. The controller means separates adjacent first and second time periods by a third time period during which no turn-on signals are supplied by the controller means, and supplies the turn-on signals during the first and second time periods in response to a condition of the output voltage. The deadband control means is coupled to receive the signal indicative of the state of the primary switch means and is coupled to the controller means, and causes the controller means to extend a third time period whenever a primary switch is on during the third time period until both primary switches of a pair coupled to the input voltage are off.

The controller means preferably includes means for generating time signals which determine the first, second and third time periods, and the deadband control means is preferably coupled to the timing signal generating means and causes the timing signals to be altered to extend the third time period whenever a primary switch is on during the time period. The timing signal generating means preferably includes an oscillator which generates a signal having a period which is directly proportional to the sum of the first, second and third time periods and from which the timing signals are derived, and the deadband control means is coupled to the oscillator and causes the signal therefrom to be altered whenever a primary switch is on during the third time period. Preferably, circuitry is coupled to the oscillator for generating timing signals from the oscillator output signal which determine the first, second and third time periods.

The signal generated by the oscillator is preferably of a predetermined level to commence the third time period and is preferably maintained by the oscillator at the predetermined level for a fixed time, and the deadband control means is coupled to the oscillator output and extends the predetermined level beyond the fixed time whenever a primary switch is on during the third time period.

Preferably, the means for generating the signal indicative of the state of the primary switch means comprises rectifier means coupled to the output of the primary switch means having an output to which the deadband control means is coupled.

The deadband control means according to one embodiment comprises a first comparator having one input coupled to the output of the rectifier means to receive the signal indicative of the state of the primary switch means, and an output, the level of which is responsive to the signal from the output of the rectifier means; a second comparator having one input coupled to the oscillator output and an output coupled to the output of the first comparator; and coupling means coupling the output of a second comparator and the one input of the second comparator, such that the output signal of the oscillator is clamped at approximately the predetermined signal level by the outputs of the comparators and the coupling means whenever a primary switch is on during the third time period.

Preferably, the coupling means comprises a diode coupled between the output of the second comparator and the one input of the second comparator.

The above and other objects, aspects, features and advantages of the invention will be more readily perceived from the following description of the preferred embodiments thereof taken with the accompanying drawings and appended claims.

BRIEF DESCRIPTION OF THE DRAWINGS

The present invention is illustrated by way of example and not limitation in the figures of the accompanying drawings in which like numbers indicate similar parts and in which.

DESCRIPTION OF THE PREFERRED EMBODIMENTS

Figure 1:
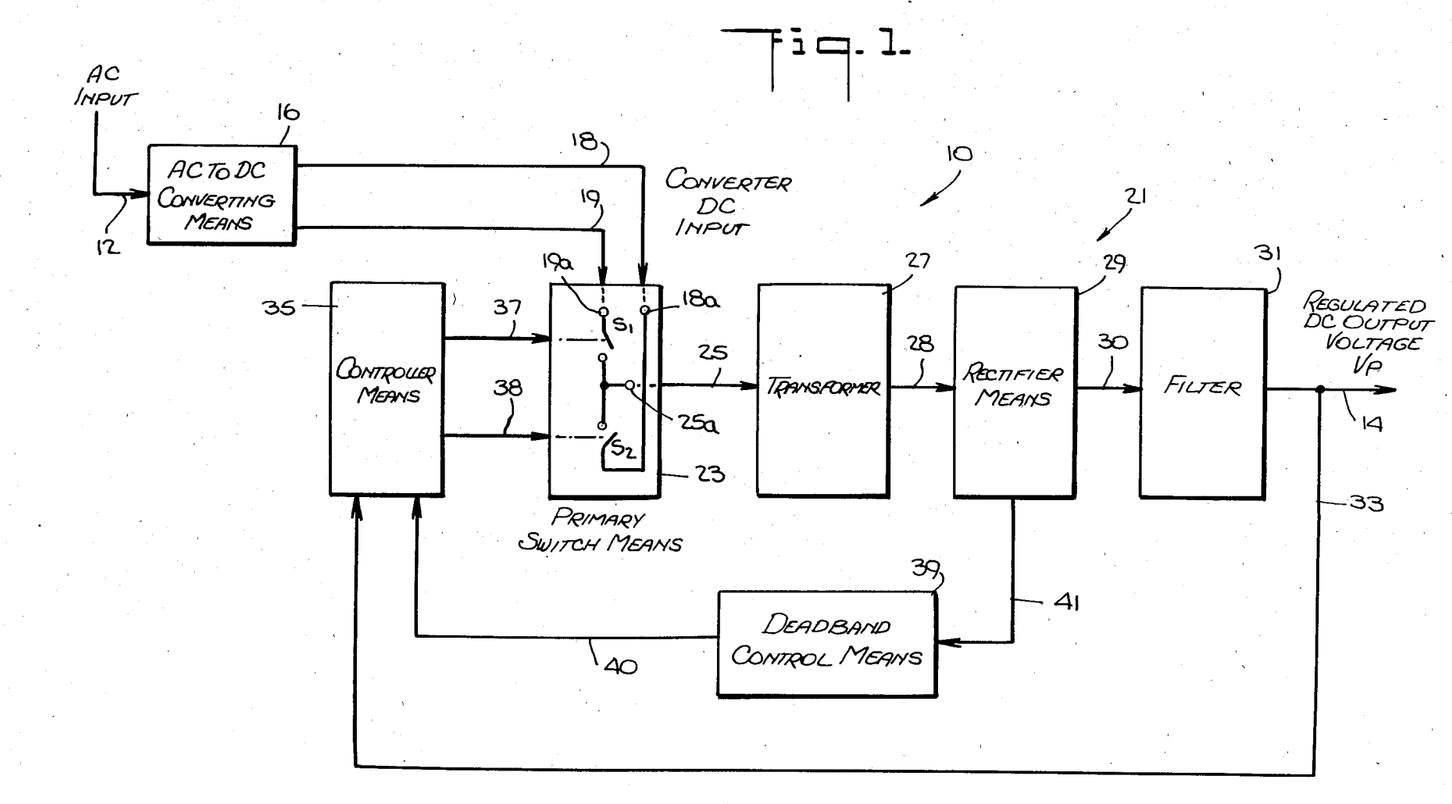
FIG. 1 is a simplified block diagram of an AC to DC converter including a DC to DC switch mode converter according to the present invention.

FIG. 1 depicts an AC to DC converter 10 for converting an AC input voltage on line 12 to a regulated DC output voltage ("$V_p$") on line 14. The converter 10 includes AC to DC converting means 16 for providing a DC input voltage on lines 18 and 19 from the AC input voltage on line 12, and a DC to DC switch mode converter 21 for converting the DC voltage supplied on lines 18 and 19 to the regulated DC output voltage on line 14. The AC to DC converting means 16 can include protection, rectifying and filtering circuits, as well as transformers and energy storage circuits, all of which can be conventional and therefore will not be described further.

The DC to DC converter 21 in FIG. 1 includes a primary switch means 23 having first and second voltage inputs 18a, 19a coupled to lines 18 and 19, and an output 25a coupled to line 25, which chops the DC input voltage on lines 18 and 19 to convert it to an AC voltage on the switch means output 25a. The converter 21 also includes a transformer 27 which receives the AC voltage on line 25 and provides a voltage on line 28 stepped up or down to approximately the level desired for the regulated DC output voltage; a rectifier means 29 which rectifies the AC voltage on line 28 from the transformer 27 to provide a rectified voltage on line 30; and a filter 31 which filters the rectified voltage on line 30 from the rectifier means 29 to provide the DC output voltage on line 14. The DC voltage on line 14 is regulated by controlling the switch parameters of primary switch means 23, and line 33 couples the DC output voltage on line 14 to controller means 35, which varies the switching parameters of the primary switch means 23 so as to maintain the DC voltage output on line 14 at a constant, desired level.

Figure 1A:
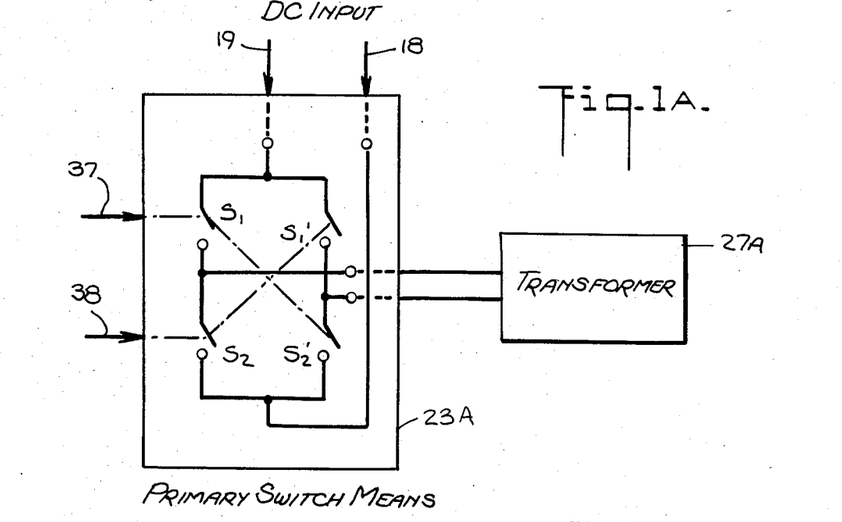
FIG. 1A is a schematic diagram of another embodiment of the primary switch means of the DC to DC converter of FIG. 1.
Figure 2:
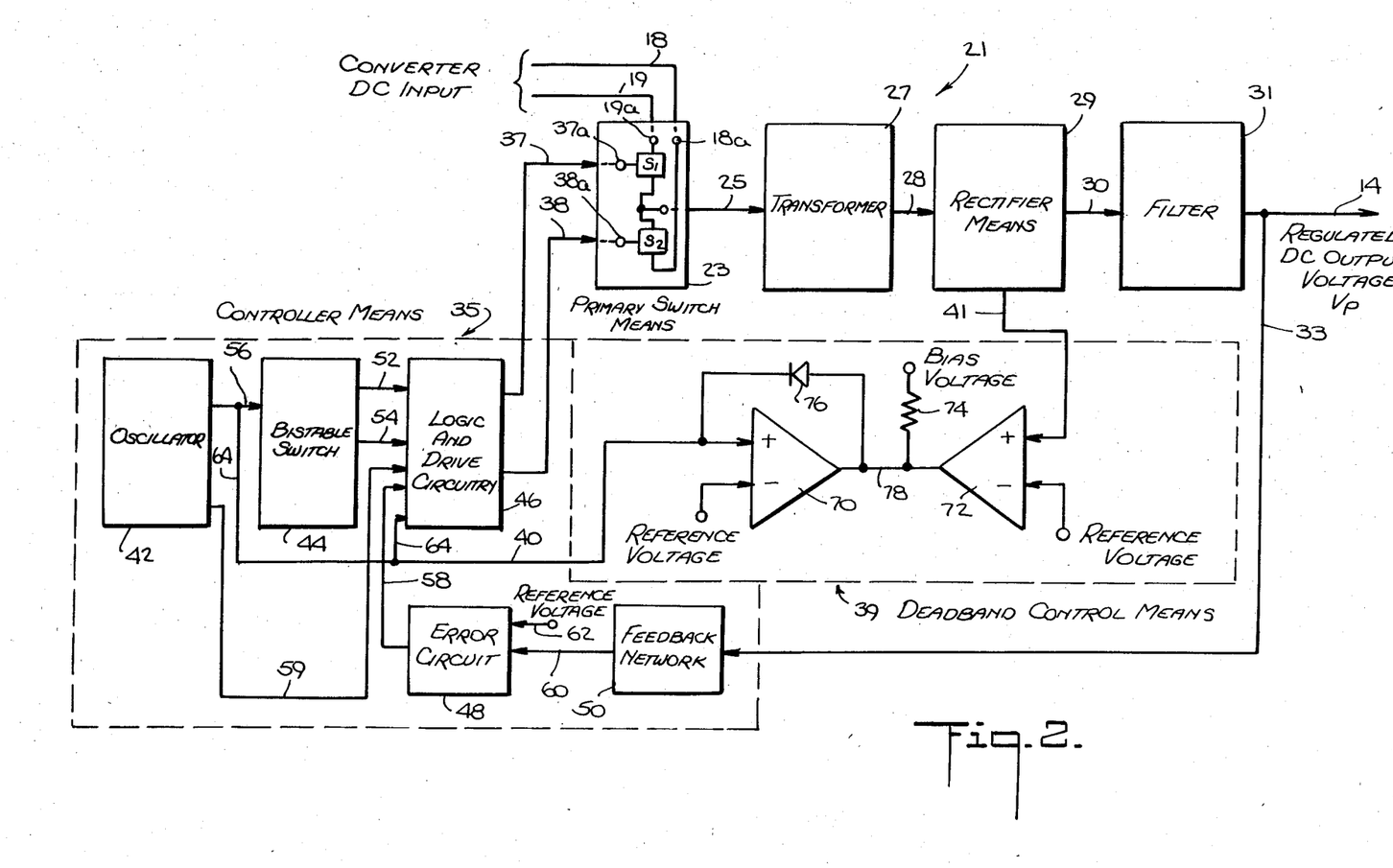
FIG. 2 is a more detailed block diagram and partial schematic of the DC to DC converter depicted in FIG. 1.

The primary switch means 23 includes a pair of primary switches, designated $S_1$ and $S_2$, each of which is alternately opened (i.e., rendered substantially non-conducting or "off") and closed (i.e., rendered substantially conducting or "on") in response to control signals applied thereto from controller means 35. As depicted in FIGS. 1 and 2, switches $S_1$ and $S_2$ are coupled in a half bridge configurarion. The primary switch means 23 includes control input means comprising two control inputs coupled to lines 37 and 38. These control inputs cause the primary switch means 23 to alternately couple one of the DC input voltages on lines 18, 19 to line 25. Although the primary switch means is shown to have a control input means comprised of two control inputs, it can be provided with a single control input on which all control signals are received by the primary switch means. Also, more than two primary switches can be coupled to the DC input voltage on lines 18 and 19, for example, in a full bridge configuration as depicted in FIG. 1A, where switches $S_1$ and $S_2'$ are switched on and off together, as are switches $S_2$ and $S_1'$. Connection of switches in half bridge, full bridge, push/pull and other configurations is known in the art and therefore will not be described further.

The switch parameter controlled by controller means 35 which essentially accounts for regulation of the DC output voltage on line 14 is the primary switch means duty cycle, i.e., the ratio expressed in percent of the total "on" time of switches $S_1$ and $S_2$ to the total period of the primary switch means. Controller means 35 supplies turn-on control signals on lines 37 and 38 to the control inputs of the primary switch means 23 which alternately turn on primary switches $S_1$ and $S_2$, and separates turn-on signals to allow the last primary switch that was on to turn off before the next primary switch is turned on.

Heretofore, converters were operated so that it was possible for one of the primary switches of a pair to be on when the other primary switch of the pair was also on. As discussed above, this situation could arise from delays in actually turning off a primary switch after a turn-off signal has been generated, as well as from other causes. The invention ensures that both primary switches of pair are not simultaneously on. To this end, the converter 21 includes a deadband control means 39 coupled to the controller means 35 via line 40, which receives a signal indicative of the state of the primary switch means and in response thereto prevents the generation of signals by the controller means 35 which would turn one of the primary switches of a pair on while the other primary switch is still on. In the embodiment of FIG. 1, the rectifier means 29 generates the signal indicative of the actual state of primary switches $S_1$ and $S_2$ and supplies it to the deadband control means 39 on line 41.

DEADBAND CONTROL MEANS 39 (FIG. 2)

Referring now to FIG. 2, an embodiment of a DC to DC converter 21 is depicted in which the controller means 35 includes a free running oscillator 42, a bistable switch 44, logic and drive circuitry 46, error circuit 48 and feedback network 50, and in which the primary switch means 23 includes solid state primary switches $S_1$ and $S_2$. The controller means is coupled by lines 37, 38 to control inputs 37a, 38a of solid state primary switches $S_1$ and $S_2$ to control the state of the primary switches.

Bistable switch 44 includes complimentary outputs 52, 54 which are always in the opposite logic state, i.e., "off"/"on" or logic "0"/logic "1" (FIG. 3), as controlled by signals supplied by the oscillator 42 to the bistable switch 44 on its input 56. The outputs 52, 54 of the bistable switch 44 are thus toggled by the oscillator 42 so that one bistable switch output is always in an on state. This toggling action can conveniently be thought of as a "steering control" for enabling a signal directing turn on (i.e., a turn-on signal) of primary switches $S_1$, $S_2$ to be generated on only one of lines 37 and 38 at any one time. In order to regulate the DC output voltage provided on line 14, the duty cycle of the signals being provided on either line 37 or 38 to the primary switch means 23, as "steered" by the bistable switch 44, is varied by the logic and drive circuitry 46 based on an error signal provided on line 58 by the error circuit 48. The error signal is supplied by the error circuit 48 to the logic and drive circuitry 46 from a feedback signal provided by the feedback network 50 on line 60 and a reference voltage provided to the error circuit 48 on line 62.

Figure 3:
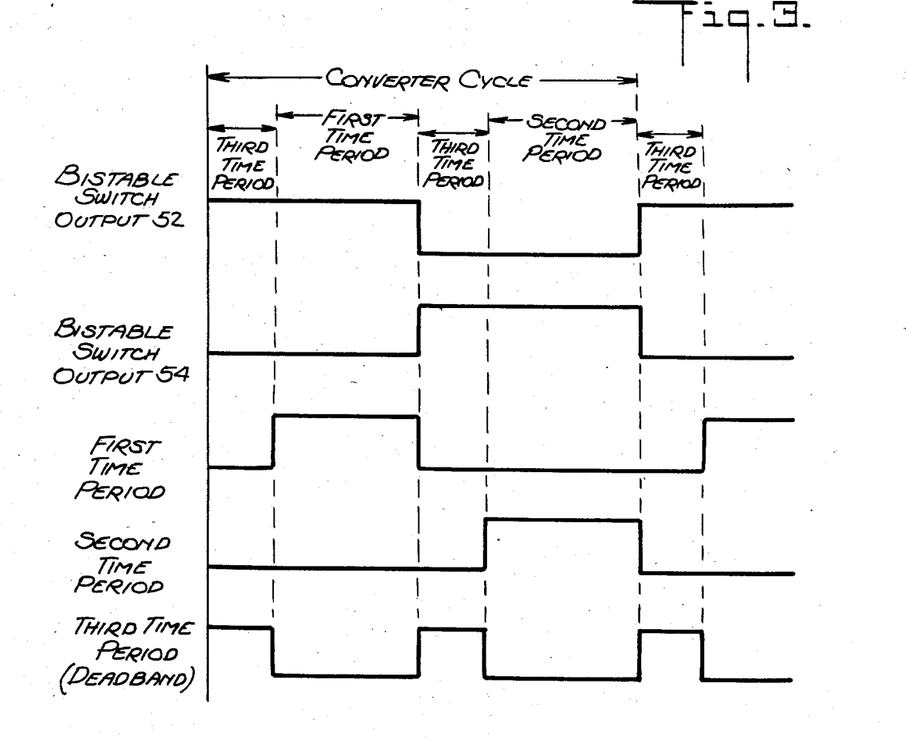
FIG. 3 is a diagram of timing periods generated in the converter depicted in FIG. 2.

Referring to FIG. 3, the bistable switch 44 establishes a first time period when one of its outputs (e.g., 52) is high and a second time period when the other of its outputs (i.e., output 54) is high. During part of the time that each of the bistable switch outputs 52, 54 is high, a third time period is generated which separates adjacent first and second time periods. A converter cycle is defined by two toggles of the bistable switch 44, i.e., the timer period during which an output 52, 54 experiences two level changes. During a converter cycle, one first time period, one second time period and two third time periods are generated, with a third time period separating each first and second time period. During the first time period, the logic and drive circuitry 46 provides turn-on control signals only to one of the primary switch means control inputs (e.g., input 37a) and during the second time period provides turn-on signals only to the other of the primary switch means control inputs (i.e., input 38a). During the third time period, no turn-on signals are generated. The timing and duration of individual turn-on signals output by the controller means to control inputs 37a and 38a are determined by the level of the DC voltage on line 14 which is fed back to the controller means 35 on line 33, as will be described below.

By providing third time periods of minimum duration, i.e., "deadbands" separating consecutive first and second time periods, the controller means 35 seeks to ensure that switches $S_1$ and $S_2$ are both off before the next turn-on signal is supplied.

The deadbands are derived from a blanking signal applied by the oscillator 42 on line 64 to the logic and drive circuitry 46, which cause the logic and drive circuitry 46 to supply turn-off control signals to primary switch means control inputs 37a and 38b directing that the primary switches $S_1$ and $S_2$ both simultaneously be turned off. The blanking signal is also applied to the bistable switch 44 (line 56) and toggles it. In the absence of deadband control means 39, the blanking signal is selected to take into account the delay times associated with turning the primary switches $S_1$ and $S_2$ off and to maintain switch turn-off signals on both of control inputs 37a and 38a longer than these delay times for all operating conditions of the converter 21. The blanking signal thereby causes the logic and drive circuitry 46 to limit the maximum duty cycle at which the primary switch means 23 can be operated. The lower the maximum duty cycle at which primary switch means 23 is permitted to operate, the greater the safety factor in ensuring that primary switches $S_1$ and $S_2$ will not be on simultaneously. However, as the maximum duty cycle is lowered, the range of DC input signal variation and load variation which can be accommodated while maintaining the DC output voltage constant is also reduced, i.e., DC regulation capability is directly proportional to duty cycle range. Thus, duty cycle limitations and DC regulation capability are competing parameters.

The deadband control means 39 enables the maximum duty cycle at which the primary switch means 23 can be operated to be increased while at the same time ensuring that primary switches $S_1$ and $S_2$ are not simultaneously on by controlling the width of the blanking signal applied to the logic and drive circuitry 46 in accordance with the actual state of the primary switches $S_1$ and $S_2$. The deadband control means 39 is coupled to the blanking signal output of oscillator 42 via line 40 and maintains the blanking signal provided on line 64 to the logic and drive circuitry 46 until both primary switches $S_1$ and $S_2$ are off. As long as the blanking signal is maintained, no turn-on signals will be supplied by the logic and drive circuitry 46, the logic and drive circuitry will be held in a third time period and prevent progression to the next first or second time period. The deadband control means 39 thus operates as a latch to latch the blanking signal on line 64 from the oscillator 42 and suspend operation of the oscillator when the signal received by the deadband control means 39 on line 41 from the rectifier means 29 indicates that one of the primary switches $S_1$, $S_2$ is on. Thus, the blanking signal can be selected to normally permit operation of the primary switch means 23 at a relatively high duty cycle of, for example, close to 100%, and the deadband control means 39 will maintain the presence of the blanking signal in those instances where the logic and control circuitry 46 would otherwise provide a turn-on signal which would allow both primary switches $S_1$ and $S_2$ to be on at the same time. It is noted that without the deadband control means 39, the maximum duty cycle at which the primary switch means would be permitted to operate is substantially lower than with the deadband control means 39, e.g., 80%.

The deadband control means 39 comprises comparators 70 and 72, and resistor 74 and diode (coupling means) 76. Comparator 72 has its inverting input coupled to a reference voltage and its non-inverting input coupled to line 41 from the rectifier means 29. The output of comparators 70 and 72 are coupled together as a common output 78. The resistor 74 is coupled to a positive bias voltage and the diode 76 is coupled between the common output 78 and the non-inverting input of comparator 70 poled to conduct current from the common output 78 to the non-inverting input of comparator 70. The inverting input of comparator 70 is coupled to a reference voltage and the non-inverting input of comparator 70 is coupled via line 40 to the blanking signal output (line 64) of oscillator 42.

Each of comparators 70 and 72 can be considered as a logic element having a "1" or "high" level when the respective non-inverting input exceeds the inverting input and a "0" or "low" level when the inverting input exceeds the non-inverting input. However, with their outputs connected together, when one of the outputs is pulled low, then the common output 78 follows. In order for the common output 78 to go high, each of the comparators 70 and 72 must have an inverting/non-inverting input relationship which causes the individual output of each comparator to go high. Comparators 70, 72 can be of the open collector type, which are available, for example, from National Semiconductor Corp.

as model LM 339. The signal on line 41 from the rectifier means 29 and the reference voltage to comparator 72 are selected so that the signal on line 41 is high and exceeds the reference voltge when either of primary switches S₁ and S₂ is on, and is low and less than the reference voltage when both of primary switches S₁ and S₂ are off. The level of the bias voltage and the value of resistor 74 are selected so that the common output 78 of comparators 72 and 70 when low prevents diode 76 from becoming forward biased in the presence of the blanking signal on line 40. The level of the reference voltage applied to comparator 70 is less than the blanking signal when the blanking signal is high so that the common output 78 will go high in the presence of a high blanking signal and a high signal on line 41. The bias voltage is further selected so that a high produced at the common output 78 when line 41 and the blanking signal are high forward biases diode 76 and latches comparator 70 until the signal on line 41 goes low to clamp the common output 78 low.

In operation, in the absence of a blanking signal high, the output of comparator 70 is held low, which holds the output of comparator 72 low regardless of the signal level on line 41 from rectifier means 29. Thus, the deadband control means 39 has no effect on the controller means 35 during the first and second time periods.

Also, when the signal level on line 41 from the rectifier means 29 is low, indicating that both primary switches are off, the output of comparator 72 is held low, and hence the output of comparator 70 is held low regardless of whether a blanking signal is applied to the non-inverting input of comparator 70. Thus, deadband control means 39 has no effect on the controller means 35 when both primary switches are off, even in the third period when a blanking signal is generated by oscillator 42. As a result, the third time period is exactly the same as the fixed, short-time width of the blanking pulse from the oscillator 42 when both primary switches are off.

However, when a blanking signal is high, and the signal level on line 41 is high indicating that one of the primary switches is on, the common output 78 of comparators 70 and 72 will go high. The high common output 78 forward-biases diode 76 to conduct the common output 78 to the non-inverting input of comparator 70 and latch the output of comparator 70 high, to thereby maintain line 40 and the blanking signal from the oscillator 42 on line 64 high and suspend operation of the oscillator 42. This causes the logic and drive circuitry 46 to prevent the application of turn-on signals to primary switch means control inputs 37a and 38a until the comparator 70 is unlatched, i.e., until the signal on line 41 goes low indicating that both of primary switches S₁ and S₂ are off, which causes the common output 78 of comparators 70 and 72 to go low to reverse bias diode 76 and unlatch comparator 70. Subsequent blanking signals from oscillator 42 will be unaffected by the deadband control means 39 as long as the signal on line 41 is less than the reference voltage to comparator 72, indicating that both of primary switches S₁ and S₂ are off. The deadband control means 39 thus effectively maintains or extends the blanking signal and the third time period whenever either of primary switches S₁ and S₂ is on when a blanking signal is generated.

Figure 4:
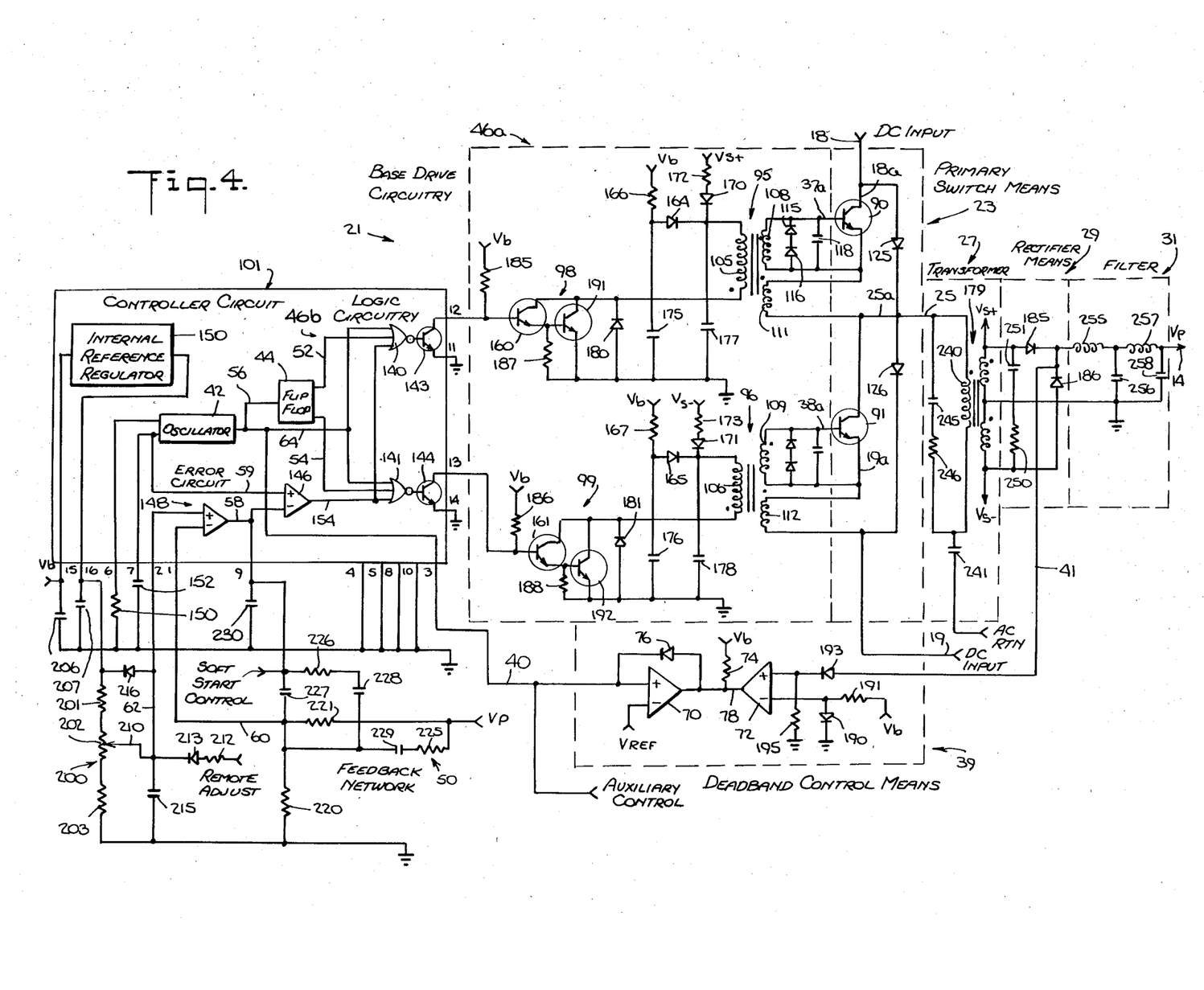
FIG. 4 is a schematic diagram of the converter depicted in FIG. 2.

CONVERTER CIRCUIT DESCRIPTION (FIG. 4)

A more detailed description of the converter 21 will be made with reference to FIG. 4. The converter 21 depicted in FIG. 4 can provide a primary output voltage $V_p$ on line 14 of, for example, 5 v.

Primary Switch Means 23

The primary switch means 23 comprises primary transistor switches 90, 91 coupled to the DC voltage lines 18 and 19 from the inverter means 16 (FIG. 1). The voltage input 18a to primary transistor switch 90 is its collector, which is coupled to DC input voltage line 18, and the voltage input 19a to primary transistor switch 91 is its emitter, which is coupled to DC input voltage line 19 through transformer winding 112. Transistors 90, 91 function as the primary converter switches to alternately switch the DC input voltage on lines 18 and 19 (e.g. +150 V, −150 V derived from a 115 V AC input) to the common output 25a of the primary switch means 23. The transistors 90, 91 are coupled to base drive circuitry 46a (part of logic and drive circuitry 46 in FIG. 2), which includes transformers 95, 96 and Darlington circuits 98, 99. The Darlington circuits 98, 99 are coupled to a controller circuit 101, and the transformers 95, 96 couple the Darlington circuits 98, 99 to the bases 37a, 38a (control inputs) of transistors 90, 91, respectively.

The controller circuit 101 includes part of the logic and drive circuitry 46 (FIG. 2), i.e. the logic circuitry 46b, as well as the oscillator 42, the flip-flop (bistable switch) 44 and the error circuit 48 of the controller means 35 in FIG. 2. The controller circuit 101 can be and preferably is a pulse width modulator, integrated circuit, which is available from Silicon General, Inc. of Garden Grove, CA as model SG1524, or its equivalent. The model SG1524 includes elements in addition to those depicted in FIG. 4, but these additional elements have not been shown for clarity. However, the terminals of the SG1524 pulse width modulator have been designated in FIG. 4 thereby enabling one of skill in the art to connect it or its equivalent into the circuit depicted in FIG. 4.

Transistors 90 and 91 operate as saturated switches to alternately couple the DC input voltage on lines 18 and 19 to the output transformer 27. This operation places an AC voltage across the output transformer 27 having a frequency (e.g. 20 Khz) equal to the frequency of the primary switch means 23 and an amplitude related to the DC input voltage on lines 18 and 19 (which in turn is related to the AC input voltage to the inverter means 16). The "on" duty cycle of transistors 90 and 91 is such that the voltseconds impressed across the output of transformer 27 can be varied to produce a regulated DC output voltage on line 14 for a wide range of AC inputs to the inverter means 16 and a wide range of load conditions at the output 14.

Base Drive Circuitry 46a and Primary Switch Means 23

Transformer 95 controls transistor 90 and transformer 96 controls transistor 91. Each of these transformers 95, 96 includes a primary winding 105, 106 coupled to a respective Darlington circuit 98, 99, a secondary winding 108, 109 coupled between the base and emitter of the respective transistor 90, 91 and a feedback winding 111, 112. Feedback winding 111 is coupled to the secondary winding 108 of transformer 95 and to the common output 25a of the primary switch means. Feedback winding 112 is coupled to the secondary winding 109 of transformer 96 and to the DC input line 19.

Transistor 90 is switched on as follows. When the primary winding 105 of transformer 95 is conducting, current flows out of the dot side of the winding (into the dot is considered positive current flow), and transistor 90 is back biased and held in the off state. During this time a flux density is established in the core of the transformer 95 and the core stores energy. Since the flux in the core cannot change instantaneously, when current in the primary winding 105 of transformer 95 is interrupted, the energy stored in the core forces current to flow in the transformer secondary winding 108 in an attempt to maintain flux continuity. Since current flow was out of the dot side in the transformer primary winding 105, it is also out of the dot side in the transformer secondary winding 108 and into the base of transistor 90. This turn-on current causes transistor 90 to become forward biased and current to flow into the dot side of the feedback winding 111 of transformer 95. The current into the base of transistor 90 must increase in order to maintain continuity of the flux as the collector/emitter current of transistor 90 flowing through the feedback winding 111 increases. This operation describes the basic principle of proportional base drive, i.e., the base drive current increases as the collector current increases. The ratio of base current increase to collector current increase is generally the turns ratio of the secondary and feedback windings 108, 111 of transformer 95, noting that base current also results from the core energy, so that the base current is somewhat more than the ratio of the turns of these transformer windings. A high on control input 37a from secondary winding 108 therefore turns transistor 90 on.

To turn transistor 90 off, a large current is forced to flow out of the dot side of the primary winding 105 of transformer 95, i.e., a negative voltage is applied across the primary winding 105. The response in the transformer secondary winding 108 attempts to maintain the continuity of the flux as described for the turn-on of the transistor 90. Since the collector current of transistor 90 is set by the load on line 14, the only current that can change is the base current of transistor 90 which is forced to flow out of the base of transistor 90. After the charge stored in transistor 90 is depleted, it turns off, the current in the feedback winding 111 is reduced to zero and the current in the primary winding 105 is greatly reduced to maintain the continuity in the flux. For the balance of the primary switch means cycle, the base/emitter junction of transistor 90 is back biased or perhaps slightly forward biased, and transistor 90 is off. A negative voltage or low on control input 37a turns transistor 90 off. Switching of primary transistors 90 and 91 will be discussed in more detail below.

Diodes 115 and 116 between the base and emitter of transistor 90 prevent the negative voltage applied across the base/emitter from becoming excessive. These diodes also assist transistor 90 in recovering from ringing that may occur at the base of transistor 90 as a result of parasitic reactances. Capacitor 118 connected between the base and emitter of transistor 90 controls such ringing and also filters out the parasitic effects of switching transistor 91 on and off.

Transistor 91 is coupled to transformer 96 in a manner similar to the coupling of transistor 90 and transformer 95, and the switching operation of transistor 91 is similar to that of transistor 90 described above.

Diode 125 is coupled between the collector of transistor 90 and the output of feedback winding 111 (the common output 25a of primary switch means 23), and diode 126 is coupled between the collector of transistor 91 and the output of feedback winding 112 (DC input voltage line 19). These diodes clamp the voltage generated across the respective transistor by release of the energy stored in the leakage inductance of the output transformer 27 when a respective transistor 90, 91 is turned off.

Controller Circuit 101 and Base Drive Circuitry 46a

The controller circuit 101 includes oscillator 42, flip-flop 44, NOR gates 140, 141, output transistors 143, 144, comparator 146, error amplifier 148 and internal reference voltage reguator 150. The oscillator 42 generates narrow clock pulses at twice the frequency of the primary switch means 23 (e.g., at 40 Khz), which are fed to flip-flop 44 and to one input of each of NOR gates 140, 141. The outputs of the NOR gates 140, 141 are coupled to the bases of transistors 143, 144 respectively, and the collectors and emitters of transistors 143, 144 are provided as outputs of the controller circuit 101 at terminals 11-14. Timing signals which determine the first, second and third time periods referred to above are output by transistors 143 and 144 on terminals 12 and 13 as determined by the states of NOR gates 140, 141 and flip-flop 44. One complementary outputs 52 of flip-flop 44 is coupled to a second input of NOR gate 140 and the other output 54 of flip-flop 44 is coupled to a second input of NOR gate 141. The output of the comparator 146 is fed to a third input of each of NOR gates 140 and 141. Coupled to the oscillator 42 via terminals 6 and 7 respectively are an external resistor 150 and an external capacitor 152 which determine the basic timing of the oscillator 42 (e.g., 40 Khz). The oscillator 42 establishes a constant charging current into the capacitor 152 to produce a linear ramp voltage across the capacitor 152.

The output from the oscillator 42 (lines 56 and 64) is a narrow clock pulse (blanking pulse) which occurs each time the external capacitor 152 is discharged. This narrow blanking pulse on line 64 causes the outputs of both NOR gates 140 and 141 to go low, thereby turning output transistors 143 and 144 off for the duration of the pulse and ensuring that output transistors 143 and 144 are not on simultaneously during transitions of the oscillator output. The width of this blanking pulse can be controlled to some extent by the values selected for the external capacitor 152 and resistor 150, and can be, for example, 0.5 us for a 40 Khz clock rate. The narrow blanking pulses are supplied to flip-flop 44 on line 56, which divides the operating frequency of the oscillator 42 in half.

A high at output 52 of flip-flop 44 to NOR gate 140 turns transistor 143 off regardless of the logic state of the other inputs to NOR gate 140. This corresponds to the half cycle of primary switch means 23 in which transistor 90 is off. A low at the output 52 of flip-flop 44 to NOR gate 140 enables transistor 140 to be turned on in accordance with the output of comparator 146, i.e. in accordance with the DC output voltage on line 14, except when a blanking pulse (high) is supplied by oscillator 42 on line 64 during the deadband period. This corresponds to the half cycle of the primary switch means 23 in which transistor 90 is turned on in accordance with the state of the DC output voltage on line 14. Flip-flop 44, NOR gate 141 and transistor 144 operate in a complementary manner.

The error amplifier 148 is a differential amplifier which provides an error output on line 58 proportional to the difference between error and reference signals applied to its input via terminals 1 and 2 of the controller circuit 101. The error output of the error amplifier 148 is compared in comparator 146 with the ramp voltage on line 59 generated across external capacitor 152, and the comparator 146 provides a logic signal on line 154 to NOR gates 140, 141 which overrides the flip-flop outputs 52, 54 to drive the outputs of NOR gates 140, 141 low and turn transistors 143 and 144 off.

The controller circuit 101 includes an internal reference voltage regulator 150 used to generate a reference voltage on terminal 16 and a regulated voltage for use by circuitry internal to the controller circuit 101.

Further details regarding operation of the model SG1524 pulse width modulator are set forth in publications available from Silicon General, Inc.

The signals output from controller circuit 101 are fed to base drive circuitry 46a to control the primary transistor switches 90, 91. The collector of transistor 143 (terminal 12) is coupled to the base of transistor 160 of Darlington circuit 98 and the collector of transistor 144 (terminal 13) is coupled to the base of transistor 161 of Darlington circuit 99. Each of the Darlington circuits 98, 99 is connected between the dot side of the primary winding 105, 106 of transformers 95, 96, respectively, and ground. The other side of each of the primary windings 105, 106 is coupled to a positive source of voltage, specifically, a bias voltage $V_b$, through a diode 164, 165 and a resistor 166, 167, respectively. Capacitors 175 and 176 are coupled to resistors 166 and 167 respectively, and are charged from the bias voltage $V_b$. The bias voltage $V_b$ can be generated by components (not shown) coupled to the AC to DC converting means 16, and/or to the converter 21, or generated by components not associated with the converter 21 and converter 10. For example, $V_b$ can be 12 V DC.

The side of the transformer primary winding 105, 106 coupled to $V_b$ is also coupled to the unrectified, primary voltage Vs+, Vs− from the secondary winding 179 of transformer 27 through a diode 170, 171 and a resistor 172, 173, respectively. Capacitors 177 and 178 are coupled to diodes 170 and 171, respectively, and are charged from the unrectified voltages Vs+ and Vs− from the secondary winding 179 of transformer 27.

Resistors 185, 186 coupled to the Darlington circuits provide biasing for the Darlington circuits derived from the bias voltage $V_b$. Resistors 187 and 188 provide bias current for Darlington transistors 160 and 161.

Controller circuit 101 controls the current in the primary windings 105, 106 of transformers 95, 96 to produce a regulated DC output on line 14 as follows. During one half cycle of the primary switch means 23, terminal 12 of the controller circuit 101 is forced high to provide a turn-off control signal to primary transistor switch 90 and turn it off. A high on terminal 12 turns on the Darlington circuit 98 and couples the dot side of primary winding 95 essentially to ground, which causes current to flow through primary winding 95 and turn primary transistor switch 90 off. During this same half cycle, terminal 13 is permitted to be forced low after the deadband period, in accordance with AC input and load conditions, which provides a turn-on control signal to primary transistor switch 91 and turns it on. A low at terminal 13 switches the Darlington circuit 99 off and blocks current flow through primary winding 106, which causes transistor 91 to be turned on. During the other half cycle, the process is reversed, and terminal 13 is forced high to turn on the Darlington circuit 99, which causes generation of a turn-off signal to turn transistor 91 off, and, after termination of the deadband period, terminal 12 is permitted to be forced low to turn Darlington circuit 98 off, which causes generation of a turn-on signal to turn transistor 90 on. In the deadband period during blanking pulses, terminals 12 and 13 are both forced high, the Darlington circuits 98, 99 are both switched on, and turn-off signals are generated to turn transistors 90, 91 off.

When terminal 12 of the controller circuit 101 is high, then Darlington circuit 98 will be on with current flowing out of the dot side of the primary winding 105 of transformer 95. The DC voltage across capacitor 175 charged from the bias voltage $V_b$ produces a negative voltage across the transformer primary winding 105 and keeps transistor 90 in the off state. The magnetizing current flowing in the transformer primary winding 105 reflects how much energy is stored in the core of transformer 95.

The value of capacitor 175 is such that there is very little change in the voltage across it during normal operation. When the Darlington circuit 98 is off, the charge on capacitor 175 is restored from the bias voltage $V_b$ by conduction through resistor 166. At this time, diode 164 is back-biased. When the Darlington circuit 98 is on, then charge is removed from capacitor 175 through diode 164 and the transformer primary winding 105. For the average voltage across transformer primary winding 105 to be zero, the average voltage across capacitor 175 is varied as the duty cycle changes, but not enough to alter the basic converter operation.

Voltages Vs+ and Vs− from the secondary winding 179 of transformer 27 are fed back to the base drive circuitry 46a to assist in turning transistors 90, 91 off. After the Darlington circuit 98 has been turned on by a high level at terminal 12, and transistor 90 has been turned off, the collectors of the Darlington transistors 160, 191 are essentially at ground potential and the dot side of the primary winding 105 of transformer 95 is at essentially zero volts. Diode 170 is reverse biased and the other side (opposite the dot) of the primary winding 105 is essentially at the same potential as capacitor 175. Magnetizing current then flows in the primary winding 105 as set by the voltage at capacitor 175. When terminal 12 goes low, the Darlington circuit 98 is turned off and its output is open, thereby preventing the magnetizing current from flowing in transformer 95 and turning transistor 90 on as described above. As the secondary 179 of transformer 27 responds, Vs+ rises and charges capacitor 177 through resistor 172 and diode 170 very quickly with a large current, e.g., 1. As long as transistor 90 is on, Vs+ is high. During this time, diode 164 is reverse biased and capacitor 175 is effectively disconnected from the base drive circuit 46a but charged through resistor 166.

To turn transistor 90 off again, terminal 12 of the controller circuit 101 is forced high to turn the Darlington circuit 98 on. The dot side of the primary winding 105 of transformer 95 is then clamped at about zero volts, as described above. This causes a large current to flow out of the dot of the primary winding 105 and absorbs all of the ampere turns produced by the feedback winding 111 and causes the primary 105 to demand even more current. The only place to get more ampere turns and hence more current is out of the base of transistor 90. Such current, i.e. reverse base or turn-off current, can only flow out of the base of transistor 90 as long as charge is stored in its base. The secondary winding 108 of transformer 95 is at a rather high voltage because transistor 90 has not yet turned off and Vs+ from the secondary winding 179 of the transformer 27 is high. This provides a much greater voltage to induce turn-off current out of the base of transistor 90 then if the bias voltage $V_b$ and the capacitor 175 were relied on solely. This large voltage derived from Vs+ causes a rapid buildup of current in the primary winding 105 of transformer 95 which provides turn-off current to the base of transistor 90.

Because of storage time in transistor 90, it takes considerable time for the charge in transistor 90 to be depleted and for transistor 90 to turn-off, for example, as long as 3 us. During this time the voltage Vs+ remains high to provide turn-off drive. When the charge is finally depleted and transistor 90 turns off, the voltage Vs+ at the secondary winding 179 of transformer 27 falls, diode 170 is reverse biased and the voltage on the capacitor 177 provides the final thrust of drive current to complete the turn-off process and then diode 164 forward biases and capacitor 175 keeps transistor 90 reverse biased during the balance of the converter cycle. The voltage across capacitor 175 keeps the transistor 90 off until the next time it is to be turned on. During this time, the magnetizing current of transformer 95 recovers so that the next cycle can begin.

Transistor 91 operates in a similar manner with Vs— being supplied to the primary winding 106 of transformer 96 via resistor 173 and diode 171.

Deadband Control Means 39

As described above, the length of time each ouput transistor 143 and 144 of the controller circuit 101 is on is determined by the complementary outputs of flip-flop 44, and the blanking pulses from the oscillator 42, and by the logic signal from comparator 146. As also discussed above, the blanking pulse which separates approximate half cycles of the primary switch means 23 does not always ensure that both transistors 90 and 91 are off before the next half-cycle begins. This is because the width of the blanking pulse (e.g., 0.5 us or greater) is selected as a compromise between maximum duty cycle achievable and safety in ensuring that transistors 90 and 91 are both off before the next half cycle begins, and because the blanking pulse generated by the oscillator 42 is not related to the actual state of primary transistors 90 and 91. The deadband control means 39 ensures that transistor 90 or 91 will not be switched on while the other is still on. This is accomplished by forcing the output of the oscillator 42 high, i.e, forcing the blanking pulse high, as described above. To this end, the non-inverting input of comparator 70 is coupled via line 40 and terminal 3 to the output of oscillator 42 in the controller circuit 101. The non-inverting input of comparator 72 is coupled via line 41 to the interconnection of rectifier diodes 185, 186. For a 5 v output voltage, line 41 is high when one of transistors 90, 91 is on and low when both are off.

As discussed above in connection with FIG. 2, the non-inverting input of comparator 70 is coupled to a reference voltage, designated $V_{ref}$ in FIG. 4, whose value is determined as described above, e.g. 2.5 v for a 5 v primary output voltage $V_p$ on line 14 and a bias voltage $V_b$ of 12 v. The reference voltage can be generated by components (not shown) coupled to the AC to DC converting means 16 and/or to the converter 21, or generated by components not associated with converter 21 and converter 10.

As also discussed above in connection with FIG. 2, the non-inverting input of comparator 72 is coupled to a reference voltage, which in the embodiment of FIG. 4 is the voltage across forward-biased silicon diode 190, e.g. 0.7 v. Diode 190 is coupled to the bias voltage $V_b$ through resistor 191 to forward bias the diode 190.

The non-inverting input of comparator 72 is coupled to the rectifier means 29 through a diode 193 which blocks the application of a negative voltage to the comparator 72 by the rectifier means 29. Resistor 195 coupled between the non-inverting input of comparator 72 and ground provides a low logic voltage to the non-inverting input of the comparator 72 when diode 193 is reverse biased.

The deadband control means 40 operates as described in connection with FIG. 2 and prevents primary transistors 90, 91 from ever being on simultaneously on the basis of direct correlation with the actual state of those transistors.

Primary Voltage $V_p$ Output Adjustment

The controller circuit 101 includes an internal reference regulator 150 which receives the bias voltage $V_b$ on terminal 15 and provides a regulated voltage to internal circuits of the controller circuit 101. The internal reference regulator 150 also provides a reference voltage output (e.g., 5 v DC) on terminal 16. The voltage supplied as a reference to the non-inverting input of error amplifier 148 (terminal 2) is derived from the internal reference regulator 150 output voltage on terminal 16 by the resistive divider reference network 200 comprised of resistor 201, potentiometer 202 and resistor 203. Capacitors 206 and 207 are filter capacitors. An adjustable voltage is obtained from the internal reference voltage on terminal 16 at the wiper arm 210 of potentiometer 202 and supplied to the non-inverting input of error amplifier 148 via terminal 2. Adjustment of potentiometer 202 via a control (not shown) adjusts the primary output voltage Vp on output line 14.

The primary output voltage $V_p$ on line 14 can also be adjusted remotely via resistor 212 and diode 213 series coupled to controller circuit 101 terminal 2. Thus, the error amplifier reference voltage provided by potentiometer 202 can be overridden by a voltage (remote adjust) applied to terminal 2 via resistor 212 and diode 213. Capacitor 215 coupled from the potentiometer wiper arm 210 to ground provides filtering and diode 216 coupled between the non-inverting input of the error amplifier 148 (terminal 2) and the output of the internal reference voltage regulator 150 (terminal 16) limits the maximum voltage that can be applied to the error amplifier to that of the output of the reference voltage regulator 150.

Feedback Network 50

Feedback network 50 is provided from the primary voltage output $V_p$ on line 14 to the controller circuit 101 to cause the controller circuit to regulate the primary output voltage. More specifically, the primary output voltage $V_p$ from line 14 is divided down by a feedback circuit comprised of resistors 220 and 221 to a voltage equal to the reference voltage obtained by the divider network 200 at terminal 2 when the primary voltage $V_p$ is set at its desired level. This feedback voltage is applied via line 60 to the non-inverting input of error amplifier 148 (terminal 1 of controller circuit 101).

In addition, a loop compensation circuit comprised of resistors 225 and 226 and capacitors 227–229 couple the primary output voltage Vp on line 14 to the controller circuit 101 (inverting input of error amplifier 148 via terminal 1 and inverting input of comparator 146 via terminal 9) to provide for optimal response to load transients while maintaining good loop stability. Capacitor 230 connected to terminal 9 is a filter capacitor.

If there is any error in the primary voltage output $V_p$ on line 14, this is manifested in the signal supplied to the inverting input of comparator 146 from error amplifier 148, which modifies the duty cycle of the controller circuit 101 output, and consequently that of the primary switch means 23.

A soft start control can be coupled to terminal 9 which applies ground potential to terminal 9 when power is first turned on and gradually allows the voltage at terminal 9 to rise until the feedback network 50 takes control. The soft start control can also be activated during malfunctions (e.g. over voltage, over current) in the operation of the converter 21 and in any auxiliary components (e.g. those generating the bias voltage, reference voltage and auxiliary voltages).

In addition, further control signals, designated auxiliary control in FIG. 4, can be applied to terminal 3 to latch the output of the oscillator 42 high and independently maintain the deadband period and effectively shut down operation of the converter. Such further control signals can be generated by circuits such as over current detectors, over voltage detectors, low voltage detectors, etc.

Transformer 27, Rectifier Means 29 and Filter 31

The primary winding 240 of transformer 27 on one side is coupled via line 25 to the output 25a of the primary switch means 23, and on the other side to an AC return (AC RTN) to the AC to DC converting means 16 (FIG. 1) through capacitor 241. Capacitor 241 insures that there is no DC component on the drive side of transformer 27 and absorbs any DC voltage that may be generated, thereby maintaining the average voltage across the primary winding 240 at zero.

The transformer 27 includes primary winding 240 and secondary winding 179, and may include further primary windings and secondary windings (not shown) for an over current detector (not shown) and for auxiliary voltages (not shown). Primary switch means 23 drives the primary winding 240 of output transformer 27 back and forth between the DC input voltages on lines 18 and 19 at the converter switching rate and in response thereto secondary winding 179 provides voltages to the rectifier means 29. Secondary winding 179 has a grounded center tap and is conventionally coupled to rectifier diodes 185 and 186.

As mentioned previously, there is considerable energy stored in the leakage inductance of the transformer 27 at the time that the primary transistor switches 90, 91 turn off. Since that energy cannot be dissipated instantaneously, the current in the transformer primary winding 240 seeks to remain constant right after turn off of transistors 90, 91. At the same time, current flow into the base of the transistors 90, 91 must be terminated if the transistors are to be turned off. The primary winding 240 of transformer 27 and transistors 90, 91 therefore tend to oppose each other during transistor turn off, which tends to cause high voltage and current simultaneously in transistors 90, 91.

A snubber network comprised of capacitor 245 and resistor 246 connected in series across the transformer primary winding 240 provides a path for that current to flow, other than into the transistor switches 90, 91. The energy stored in the output transformer 27 leakage inductance must be dissipated before the voltage at the primary winding 240 of transformer 27 can settle into a steady state value of essentially zero volts. This inductance, and stray capacitance at the primary winding 240 contributed mainly by the switching transistors 90, 91, form a tank circuit which will ring indefinitely if there is nothing to absorb the energy supplied to it. Resistor 246 serves as an energy absorbing device to damp out the ringing, and also to limit the current in the tank circuit when either of the primary transistor switches 90, 91 turns on, otherwise there could be a very large switching current through the capacitor 245.

Another snubber circuit comprising resistor 250 and capacitor 251 is connected in series across the secondary winding 179 of transformer 27. This snubber network is provided because of the leakage inductance of the secondary 179 which presents a problem when either end of the primary winding 240 is driven by a respective transistor 90, 91. During the time that the primary winding 240 is not being driven by the transistor switches 90, 91, the transformer secondary winding 240 is in an idle state. However, the energy stored in the transformer 27 ensures that the current in the inductor 255 in the filter 31 is continuous, and rectifier diodes 185 and 186 each provide a portion of the required current to the inductor 255. It should be mentioned that the current in rectifier diodes 185, 186 does not divide equally because of the magnetizing current of the output transformer 27 and due to the magnetics involved. When the primary winding 240 of transformer 27 drives the secondary winding 179, one rectifier diode must be turned off and the other turned on. The leakage inductance of the transformer secondary winding 179 prevents that from happening instantaneously. Even though the primary winding 240 is driven high, essentially no voltage appears across thre secondary winding 179 until the current in one rectifier diodes 185, 186 has been reduced to zero, then the voltage across the secondary winding 179 begins to fall. However, because of the rather large junction capacity of the rectifier diodes 185, 186 the voltage across the secondary winding 179 cannot change instantaneously. This makes the capacitance of the rectifier diodes and the transformer leakage inductance look like an LC tank circuit which stores considerable energy. The purpose of the snubber network comprised of resistor 250 and capacitor 251 is to absorb that energy and damp the ringing without exceeding the voltage rating of the rectifiers diodes 185, 186.

Inductor 255, capacitor 256, inductor 257 and capacitor 258 form the filter 31 for the primary DC output voltage provided to line 14.

Certain changes and modifications of the embodiments of the invention disclosed herein will be readily apparent to those skilled in the art. For example, the particular voltages and current values given are exemplary and are not intended to limit the scope of the invention. In addition, the primary switch transistors could be coupled to drive circuitry and output circuitry in manners other than those depicted, the primary switches could be devices other than transistors and the primary switch means can comprise more than two primary switches. Also, the controller means is not limited to one which includes the model SG 1524 integrated circuit or the specific circuitry depicted in the drawings, nor is the deadband control means limited to the specific circuitry depicted in the drawings. It is the applicant's intention to cover by the claims all those changes and modifications which could be made to the embodiments of the invention herein chosen for the purpose of disclosure without departing from the spirit and scope of the invention.

What is claimed is:

1. A switch mode converter for providing an output voltage comprising:

primary switch means having control input means for receiving control signals, at least first and second voltage inputs and an output, the primary switch means including at least two primary switches and coupling the first and second voltage inputs to the output selectively through the primary switches in response to control signals applied to the control input means;

controller means coupled to the control input means of the primary switch means for providing control signals thereto, the controller means providing at least one turn-on control signal during first time periods to turn a first primary switch on during the first time periods, and at least one turn-on control signal during second time periods to turn a second primary switch on during the second time periods, the controller means providing a third time period between each adjacent first time period and second time period during which the no turn-on signals are provided by the controller means, the controller means providing the turn-on control signals during the first and second time periods in response to a condition of the output voltage;

means for generating a signal indicative of the state of the primary switch means; and deadband control means coupled to receive the signal indicative of the state of the primary switch means and coupled to the controller means for causing the controller means to maintain a third time period whenever a primary switch is on during that third time period, the deadband control means comprising:

a first comparator having one input coupled to receive the signal indicative of the state of the primary switch means, and an output the level of which is responsive to the signal indicative of the state of the primary switch means, a second comparator having an input coupled to the controller means and an output coupled to the output of the first comparator, and means coupling the output of the second comparator and the input of the second comparator, such that the input to the second comparator is clamped at a level effective to cause the controller means to maintain a third time period whenever a primary switch is on during that third time period.

2. The converter according to claim 1 wherein the controller means includes means for generating time signals which determine the first, second and third time periods, the input to the second comparator being coupled to the timing signal generating means and causing the timing signals to be altered whenever a primary switch is on during a third time period to maintain that third time period.

3. The converter according to claim 2 wherein the timing signal generating means includes an oscillator which generates a signal having a period which is directly proportional to the sum of the first, second and third time periods when the controller means is not caused by the deadband control means to extend a third time period and from which oscillator signal the timing signals are derived, and wherein the input to the second comparator is coupled to the oscillator and causes the signal therefrom to be altered whenever a primary switch is on during a third time period to maintain that third time period.

4. The converter according to claim 1 wherein the controller means comprises an oscillator which generates at an output thereof a signal having a time period directly proportional to the sum of the first, second and third time periods when the controller means is not caused by the deadband control means to extend a third time period, and logic circuitry coupled to the oscillator for generating timing signals from the oscillator signal which determine the first, second and third time periods, the input to the second comparator being coupled to the oscillator and causing the oscillator output signal to be altered whenever a primary switch is on during a third time period to maintain that third time period.

5. The converter according to claim 4 wherein the output signal generated by the oscillator is of a predetermined level to commence the third period and is maintained by the oscillator at the predetermined level for a fixed time, the output level at which the input to the second comparator is clamped being effective to maintain the predetermined level beyond the fixed time whenever a primary switch is on during a third time period to maintain that third time period.

6. The converter according to claim 5 wherein the coupling means comprises a diode; each comparator having two inputs, the other input of the first comparator being coupled to a reference voltage, and the other input of the second comparator being coupled to a reference voltage, the diode being coupled between the output of the second comparator and the input of the second comparator which is coupled to the oscillator output; and wherein the deadband control means includes a resistor coupled between a bias voltage and the output of the two comparators; the output of the first comparator being at approximately the predetermined level whenever a primary switch is on during third time period to raise the input of the second comparator which is coupled to the oscillator output to the predetermined level through the diode and thereby clamp the output of the oscillator at the predetermined level and maintain that third time period.

7. The converter according to claim 6 wherein the control input means comprises a first control input to the first primary switch and a second control input to the second primary switch, the primary switches each having an output coupled together and comprising the primary switch means output.

8. A converter including the converter of claim 4 and means coupled to the first and second voltage inputs of the primary switch means for providing a DC signal thereto from an AC signal.

9. The converter according to claim 1 wherein the means generating the signal indicative of the state of the primary switch means comprises rectifier means coupled to the output of the primary switch means for generating a rectified voltage as the signal indicative of the state of the primary switch means.

10. The converter according to claim 9 wherein the rectifier means includes two rectifier diodes having a junction at which the signal indicative of the state of the primary switch means is generated, the converter including a filter coupled to this junction and providing a DC output voltage.

11. The converter according to claim 1 wherein the control input means comprises a first control input to the first primary switch and a second control input to the second primary switch, the primary switches each having an output coupled together and comprising the primary switch means output.

12. The converter according to claim 11 wherein each primary switch comprises a semi-conductor device.

13. The converter according to claim 12 wherein each semi-conductor device comprises a transistor having a base coupled to the respective first and second control input, and a collector and an emitter coupled between the respective voltage input and the primary switch means output.

14. A converter including the converter of claim 1 and means coupled to the first and second voltage inputs of the primary switch means for providing a DC signal thereto from an AC signal.

15. The converter according to claim 1 wherein the controller means comprises a controller circuit coupled to the output voltage and drive means coupled to the controller circuit and to the primary switch means to receive the control signals from the controller circuit and control the primary switch means in response to the control signals.

16. The converter according to claim 15 wherein the drive means includes magnetic core elements.

17. The converter acording to claim 1 wherein the primary switches are coupled in a half bridge or a full bridge configuration.

18. A switch mode converter for providing a DC output voltage comprising:
primary switch means including a first primary switch having a first control input for receiving control signals, a first voltage input, and an output, and a second primary switch having a second control input for receiving control signals, a second voltage input and an output, the outputs of the two primary switches being coupled together and comprising a primary switch means output, the first primary switch coupling the first voltage input to the primary switch means output when the first primary switch is on and the second primary switch coupling the second voltage input to the primary switch means output when the second primary switch is on, the first and second primary switches coupling the respective voltage input to the primary switch means output in response to turn-on control signals applied to the respective control input;
controller means coupled to the first and second control inputs for providing control signals thereto, the controller means providing at least one turn-on control signal to the first control input during first time periods to turn the first primary switch on during the first time periods and at least one turn-on control signal to the second control input during second time periods to turn the second primary switch on during the second time periods, the controller means providing a third time period between each adjacent first time period and second time period during which no turn-on control signals are provided by the controller means, the controller means providing the turn-on control signals during the first and second time periods in response to the DC output voltage so as to maintain the level of the DC output voltage substantially constant, the controller means including means for generating timing signals which determine the first, second and third time periods;
rectifier means coupled to the output of the primary switch means for generating a rectified output voltage as a signal indicative of the state of the primary switch means; and
deadband control means coupled to the timing signal generating means and to the rectifier means for causing the timing signals to be altered whenever a primary switch is on during a third time period to maintain that third time period, the deadband control means comprising:
a first comparator having one input coupled to the rectifier means to receive the signal indicative of the state of the primary switch means, and an output the level of which is responsive to the signal indicative of the state of the primary switch means, a second comparator having an input coupled to the timing signal generating means and an output coupled to the output of the first comparator, and means coupling the output of the second comparator and the input of the second comparator, such that the input to the second comparator is clamped at a level effective to cause the timing signal generating means to generate a timing signal which maintains a third time period whenever a primary switch is on during that third time period.

19. The converter according to claim 18 wherein the timing signal generating means includes an oscillator which generates a signal having a period which is directly proportional to the sum of the first, second and third time periods when the controller means is not caused by the deadband control means to maintain a third time period and from which the timing signals are derived, and wherein the input to the second comparator is coupled to the oscillator and causes the signal therefrom to be altered whenever a primary switch is on during a third time period to maintain that third time period.

20. The converter according to claim 19 wherein the controller means includes logic circuitry coupled to the oscillator for generating the timing signals from the oscillator signal.

21. The converter according to claim 20 wherein the oscillator generates at the output thereof a signal of a predetermined level to commence the third period and maintains the predetermined level for a fixed time, the input to the second comparator maintaining the predetermined level thereat beyond the fixed time whenever a primary switch is on during a third time period to extend that third time period.

22. The converter according to claim 21 wherein the coupling means comprises a diode; each comparator having two inputs, the other input of the first comparator being coupled to a reference voltage, and the other input of the second comparator being coupled to a reference voltage, the diode being coupled between the output of the second comparator and the input of the second comparator which is coupled to the oscillator output; and wherein the means for maintaining includes a resistor coupled between a bias voltage and the output of the two comparators; the output of the first comparator being at approximately the predetermined level whenever a primary switch is on during a third time period to raise the input of the second comparator which is coupled to the oscillator output to the predetermined level through the diode and thereby clamp the output of the oscillator at the predetermined level and maintain that third time period.

23. The converter according to claim 22 wherein each primary switch comprises a semi-conductor device.

24. The converter according to claim 23 wherein each semi-conductor device comprises a transistor having a base coupled to the respective first and second control input and a collector and an emitter coupled between the respective voltage input and the primary switch means output.

25. The converter according to claim 24 wherein the controller means comprises a controller circuit coupled to the DC output voltage and drive means coupled to the controller circuit to receive the control signals therefrom and coupled to the bases of the first and second transistors to control the first and second transistors in response to the control signals.

26. The converter according to claim 25 wherein the drive means includes magnetic core elements.

27. The converter according to claim 18 wherein the rectifier means includes two rectifier diodes having a junction at which the signal indicative of the state of the primary switch means is generated, the converter including a filter coupled to this junction and providing the DC output voltage.

* * * * *